United States Patent [19]
Dent

[11] Patent Number: 5,884,073
[45] Date of Patent: Mar. 16, 1999

[54] SYSTEM AND METHOD FOR PROVIDING TECHNICAL SUPPORT OF AN ELECTRONIC SYSTEM THROUGH A WEB BIOS

[75] Inventor: David E. Dent, Portland, Oreg.

[73] Assignee: Intel Corporation, Santa Clara, Calif.

[21] Appl. No.: 739,505

[22] Filed: Oct. 28, 1996

[51] Int. Cl.$^6$ .................................................. G06F 9/445
[52] U.S. Cl. ................ 395/652; 395/200.52; 395/183.03
[58] Field of Search ................... 395/200.52, 183.12, 395/652, 183.21, 200.58

[56] References Cited

U.S. PATENT DOCUMENTS

| | | | |
|---|---|---|---|
| 5,230,052 | 7/1993 | Dayan et al. | 395/652 |
| 5,245,615 | 9/1993 | Treu | 395/183.12 |
| 5,390,324 | 2/1995 | Burckhartt et al. | 395/575 |
| 5,444,850 | 8/1995 | Chang | 395/200.52 |
| 5,455,933 | 10/1995 | Schieve et al. | 395/183.03 |
| 5,596,711 | 1/1997 | Burckhartt et al. | 395/182.21 |

FOREIGN PATENT DOCUMENTS

| | | |
|---|---|---|
| 0778529 A1 | 5/1996 | European Pat. Off. . |
| 300254 A5 | 7/1990 | Germany . |
| 7-248938 A | 9/1995 | Japan . |
| WO 97/28499 | 8/1997 | WIPO . |
| WO 97/31315 A1 | 8/1997 | WIPO . |

OTHER PUBLICATIONS

Peter Norton, Inside The PC, chapter 19, section BIOS Future, pp. 405–407, Dec. 1993.

*Primary Examiner*—Majid A. Banankhan
*Attorney, Agent, or Firm*—Blakely, Sokoloff, Taylor & Zafman LLP

[57] ABSTRACT

A system and method for altering a boot sequence provided by a Basic Input/Output System that, when executed, enables diagnostics of the electronic system containing the BIOS by a service provider. Access to the service provider may be established through a publicly accessible network such as the Internet.

13 Claims, 7 Drawing Sheets

SYSTEM AND METHOD FOR PROVIDING TECHNICAL SUPPORT OF AN ELECTRONIC SYSTEM THROUGH A WEB BIOS

BACKGROUND OF THE INVENTION

1. Field of the Invention

This invention relates to the field of system management. More particularly, the present invention relates to the alteration of a boot sequence performed by an electronic system to enable diagnostics of that system by a service provider through an accessible network.

2. Description of Art Related to the Invention

One of the most important elements of a computer is the Basic Input/Output System ("BIOS"). The BIOS is essentially code, typically stored in some form of non-volatile memory, which isolates the operating system and application programs from specific hardware devices. After "powering-on" the computer, BIOS enables a host processor to perform a number of tasks, including a boot sequence. A "boot sequence" is the initialization and testing of various hardware devices implemented within the computer.

Generally, boot sequences have remained static for a number of years. For example, a standard boot sequence performed after powering the personal computer is shown in FIG. 1. A first phase of the standard boot sequence is the initialization of chipsets and selected hardware implemented on a motherboard of the computer (Step 110). Such hardware may include a Super Input/Output "SIO" controller, keyboard controller, a video controller and the like. In the next phase, main memory devices and a variety of other hardware devices, including some or all of the initialized hardware, are tested to verify that these devices operate properly (Step 120). After the testing phase is performed, interrupts are allocated to various storage resources of the computer (Step 130). These storage resources include, but are not limited to, a hard disk drive ("HDD"), floppy disk drive ("FDD"), compact disk read only memory ("CD ROM") player and the like.

Next, a desktop management information ("DMI") file is created to include system configuration information about various hardware devices of the computer (Step 140). The contents of the DMI file may be used to perform subsequent diagnostics in case of a malfunction or to provide system information to aid during hardware or software installation. Thereafter, the operating system is loaded from diskette or from the HDD if no diskette has been inserted into the FDD (Step 150).

During the initialization, testing or allocation phases of the boot sequence, if one or more boot errors occur during the boot sequence, the computer may respond by generating an error message warning of the boot error and either temporarily or permanently halting the booting of the computer. Normally, the type of response depends on the severity of the boot error. Consequently, provided the computer is implemented with diagnostic circuitry and software to detect boot errors occurring during the boot sequence, either response may cause the boot error to be categorized and stored at predetermined location(s) in non-volatile memory thereby producing an error log, otherwise known as an "event log".

If the computer experiences a boot error and the BIOS requires servicing, a computer user currently has a few corrective options. One option is to request a computer technician to be dispatched on-site to repair the computer. Other options include removing the computer from its normal working environment and delivering it to a computer repair facility, or fixing the computer through either adjustment or replacement of hardware, re-installation of software, modification of software parameters and the like. For large businesses having hundreds or thousands of computers interconnected together through an internal network or having a large, stand-alone computer (e.g., a mainframe) experiencing a boot error, the second option of removing the computer is not viable. Likewise, the third option is not viable if the computer user is unfamiliar with the internal workings of his or her computer.

Over the last few years, it has been discovered that the use of on-site computer technicians poses a number of disadvantages. One disadvantage is that on-site servicing is a time-consuming process. This leads to longer downtime experienced by the computer user. Another disadvantage is that the computer user incurs high service costs due to the large overhead costs (e.g., transportation costs, gas, insurance, etc.) assumed by the computer service provider in providing on-site servicing.

In light of the current trend to increase memory storage size of BIOS, it would be advantageous to alter the boot sequence provided by BIOS in order to provide a more manageable electronic system being easier to service through remote system-level diagnostics and to support through a "fault tolerant" boot sequence. This would reduce repair costs and provide faster repair servicing. Furthermore, it would be advantageous to provide this remote servicing in an automated fashion so no human intervention is required.

SUMMARY OF THE INVENTION

The present invention relates to an electronic system and its corresponding method for enabling remote diagnostics of the electronic system during a boot sequence. The electronic system includes a host processor, a transceiver device and a non-volatile memory element, all of which are coupled together through a bus mechanism. The non-volatile memory element includes BIOS code that, upon execution, causes the transceiver device to establish communications with a remotely located service provider via a network in the event of a selected boot error.

BRIEF DESCRIPTION OF THE DRAWINGS

The features and advantages of the present invention will become apparent from the following detailed description of the present invention in which:

FIGS. 3-1 and 3-2 is a flowchart illustrating one embodiment of the Web BIOS boot sequence that establishes an interconnection over a network for remote servicing of the electronic system upon experiencing a boot error.

DESCRIPTION OF THE PREFERRED EMBODIMENT

The present invention describes a system and method for enhancing manageability of an electronic system by altering the boot sequence performed by an electronic system to enable remote system-level diagnostics through a privately or publicly accessible network in the event of a boot error. As discussed herein, an "electronic system" is a product including circuitry capable of processing data. The electronic system may include, but is not limited to, a computer, hard copy equipment (e.g., printer, plotter, etc.), banking equipment (e.g., an automated teller machine), transport vehicles (e.g., automobiles, buses, etc.) and the like. The term "fault tolerant" is defined such that a failure or malfunction (e.g., a boot error) during the boot sequence does not result in temporarily or permanently halting the set-up of the electronic system.

Figure 2:
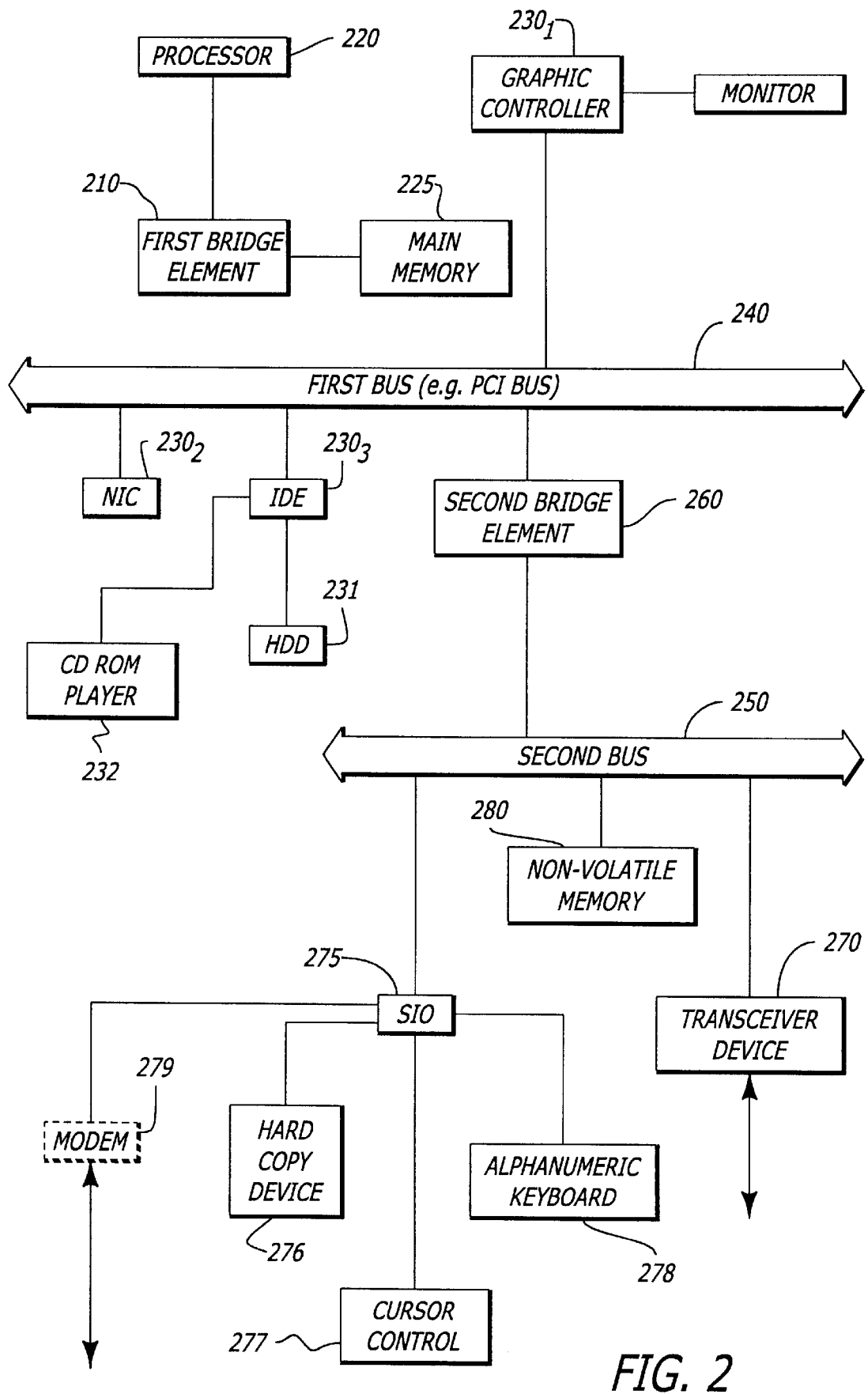
FIG. 2 is block diagram of an embodiment of an electronic system utilizing the present invention.

Referring to FIG. 2, a general block diagram of an electronic system 200 implemented with the present invention is shown. The electronic system 200 is illustrated as a computer includes a first bridge element 210 (e.g., Host-to-PCI controller) providing a communication path between a host processor 220, main memory 225 and a plurality of peripherals $230_1$–$230_n$ ("n" being a positive whole number). The peripherals $230_1$–$230_n$ are coupled to a first bus 240. The first bus 240 may include, but is not limited to, a Peripheral Component Interconnect ("PCI") bus. The peripherals $230_1$–$230_n$ may include one or more graphics controllers $230_1$, a network interface card ("NIC") $230_2$ coupled to a private internal network or an intelligent drive electronics "IDE" $230_3$ controlling a HDD 231 and/or a CD ROM player 232 as shown.

The electronic system 200 may further include a second bus 250 acting as an I/O bus (e.g., an Industry Standard Architecture "ISA" bus). The second bus 250 may be coupled to the first bridge element 210, or alternatively, to a second bridge element 260 (e.g., PCI-to-ISA controller) as shown. In addition, the second bus 250 provides a communication path for various I/O peripherals to provide information to other components within the electronic system 200. These I/O peripherals may include, but are not limited to a transceiver device 270 (e.g., a modem, cable or a connector like an Integrated Services Digital Network connector, Universal Serial Bus connector, etc.) coupled to a publicly accessible network (e.g., the "Internet") and a Super Input/Output ("SIO") controller 275 as shown. The SIO controller 275 is coupled to a number of input and/or output devices, some of which may include a hard copy device 276 (e.g., a printer) through a parallel port; a cursor control device 277 (e.g., mouse, trackball, touch pad, joystick, etc.), an alphanumeric keyboard 278 or even a modem through a serial communication port, if not implemented with a dedication connection to the second bus 250.

A non-volatile memory element 280 may be coupled to the first or second buses 240 or 250 through a dedicated connection or indirectly by implementing the element 280 on a printed circuit board ("PCB") of one of the I/O peripherals. For example, the non-volatile memory element 280 may be coupled to the second bus 250 through a modem PCB. The non-volatile memory element 280, which may be flash memory, contains BIOS used by the electronic system 200 during its boot sequence.

In this embodiment, the BIOS includes additional code which, upon execution by the host processor during the boot sequence, prompts the electronic system 200 to perform a "Web BIOS boot sequence". More specifically, the additional code prompts to electronic system 200 to establish communications with a selected service provider through a network, such as a publicly accessible network as shown herein, if certain types of boot errors are detected. The types of boot errors may be inclusive of all possible types of boot errors, or restricted to a smaller range of boot errors. In lieu of a publicly accessible network, it is contemplated that the network may include a private internal network providing a communications path, if desired, to the publicly accessible network. This communications path may be established through transceiver device 270 or NIC $230_2$ routed to the publicly accessible network through an internal private network (e.g., a local area network or an Ethernet network).

Referring still to FIG. 2, to establish communications through the transceiver device 270 for example, it would be beneficial for the non-volatile memory element 280 to further contain one or more Internet access phone numbers, a web address of the service provider and a web browser application program. However, this information may be input into memory as needed. The web browser application program may include a "light browser" which is a web browser application program configured to be more rudimentary than normal browser application programs in order to reduce its memory size allocation. The light browser might, for example, only handle text-based data transfers and display, thereby not supporting rich graphics and/or newer plug-ins for streaming data. The Internet access phone numbers may include popular inter-company prefixes (e.g., "9") used to obtain an outside business line as well as international phone numbers. During the boot sequence and upon detecting a boot error requiring servicing, the electronic system may cycle through these Internet access phone numbers until a connection is established. The Internet access phone numbers, web address and the web browser application program may be loaded into the non-volatile memory element 280 by an original equipment manufacturer ("OEM") during manufacture of the electronic system 200 or subsequent to manufacturer by the user.

It is contemplated that the BIOS may include requisite code to support AT command processing and other modem operations if the modem is either controller-less or a host-controlled. It is appreciated that a controller-less modem utilizes its host processor to execute AT command set and host-controlled modems differ from conventional modems in that both the AT command set and digital signal processing are executed by the host processor. Thus, only digital-to-analog conversion circuitry may be implemented on the modem PCB to reduce costs of the modem PCB.

Figure 1:
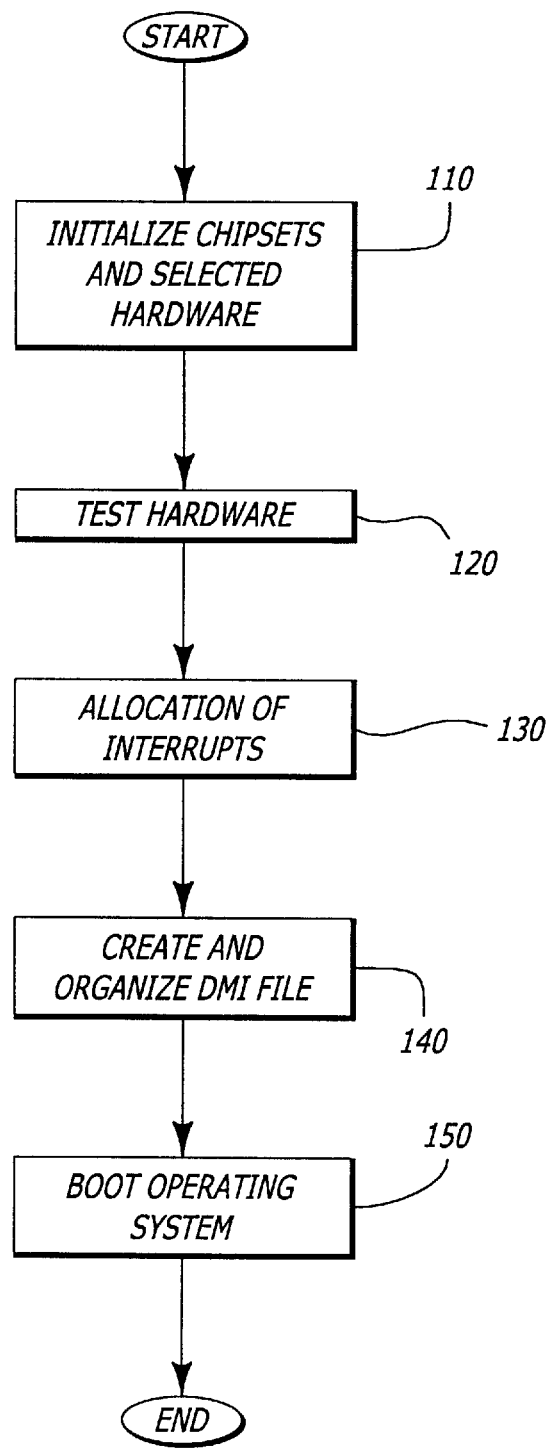
FIG. 1 is a flowchart of a conventional boot sequence undertaken by a computer.
Figures 1, 3:
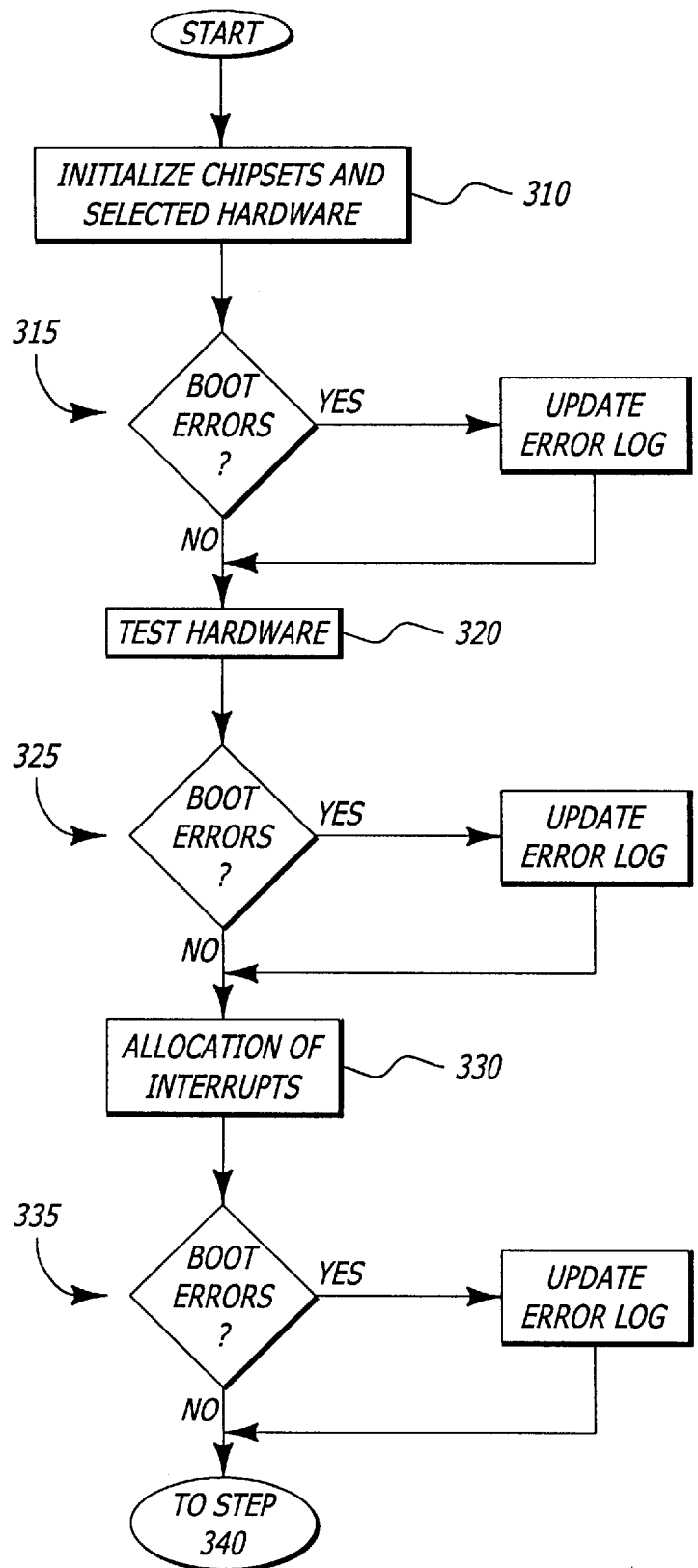
Figures 2, 3:
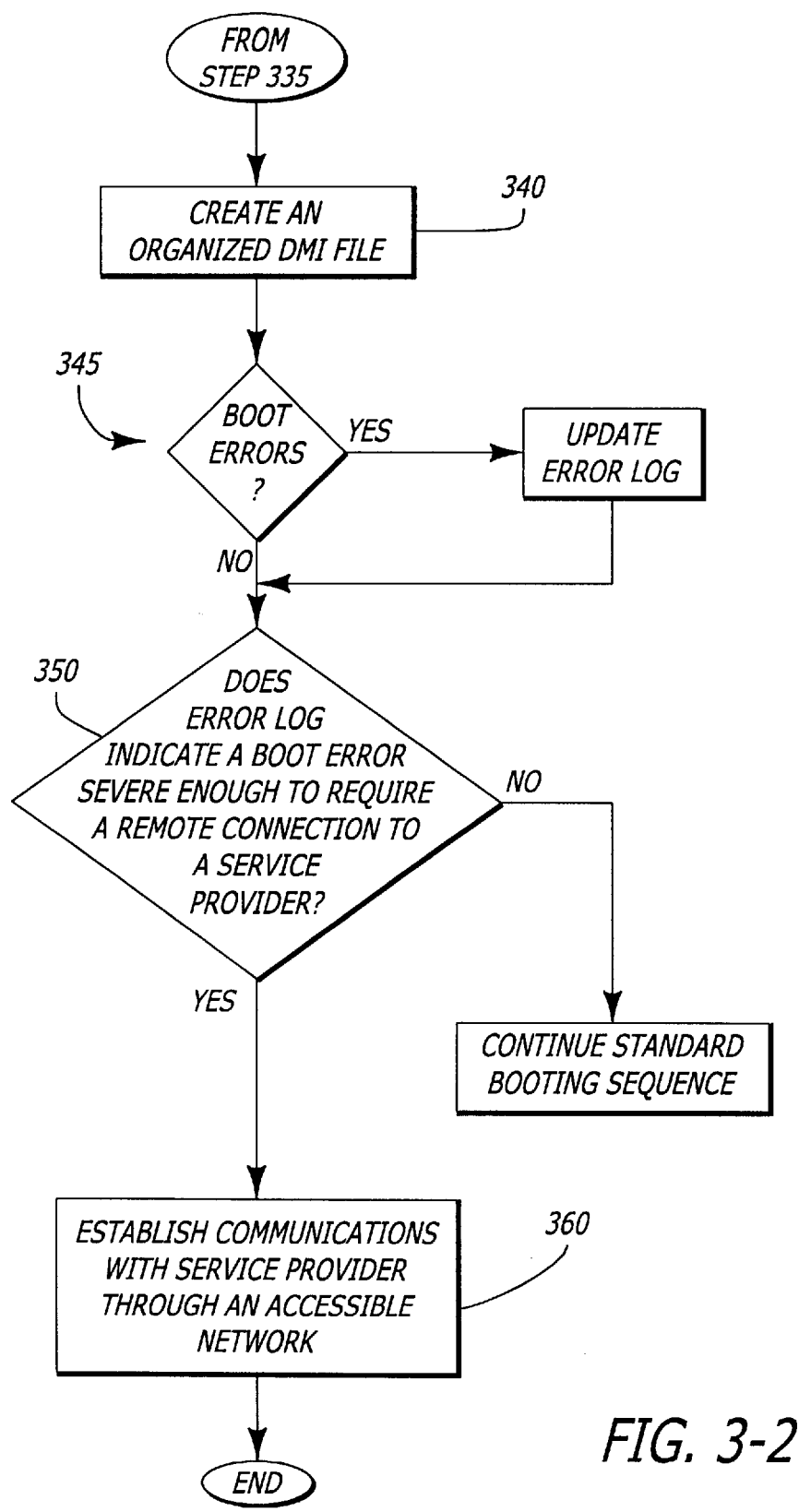

As shown in FIG. 3-1 and 3-2, one embodiment of the Web BIOS boot sequence is illustrated. After power-on, the electronic system undergoes a boot sequence similar to the phases undertaken by the standard boot sequence of FIG. 1 (Steps 310, 320, 330 and 340). However, as the phases of Steps 310–340 are performed, boot errors are recorded in a table supported by software and/or hardware (Steps 315, 325, 335 and 345). Depending on whether one or more boot errors are recorded in the table and the severity of the errors, if any, the electronic system may establish remote access to a selected service provider through the public or private accessible network, instead of proceeding with the standard boot sequence (Step 350). This enables a computer technician to remotely access contents from an error log or from another information file stored within the electronic system. From this information, the computer technician may be able to analyze the error and either correct the problem remotely or indicate to the computer user how to correct the problem to avoid the boot error.

Figure 4:
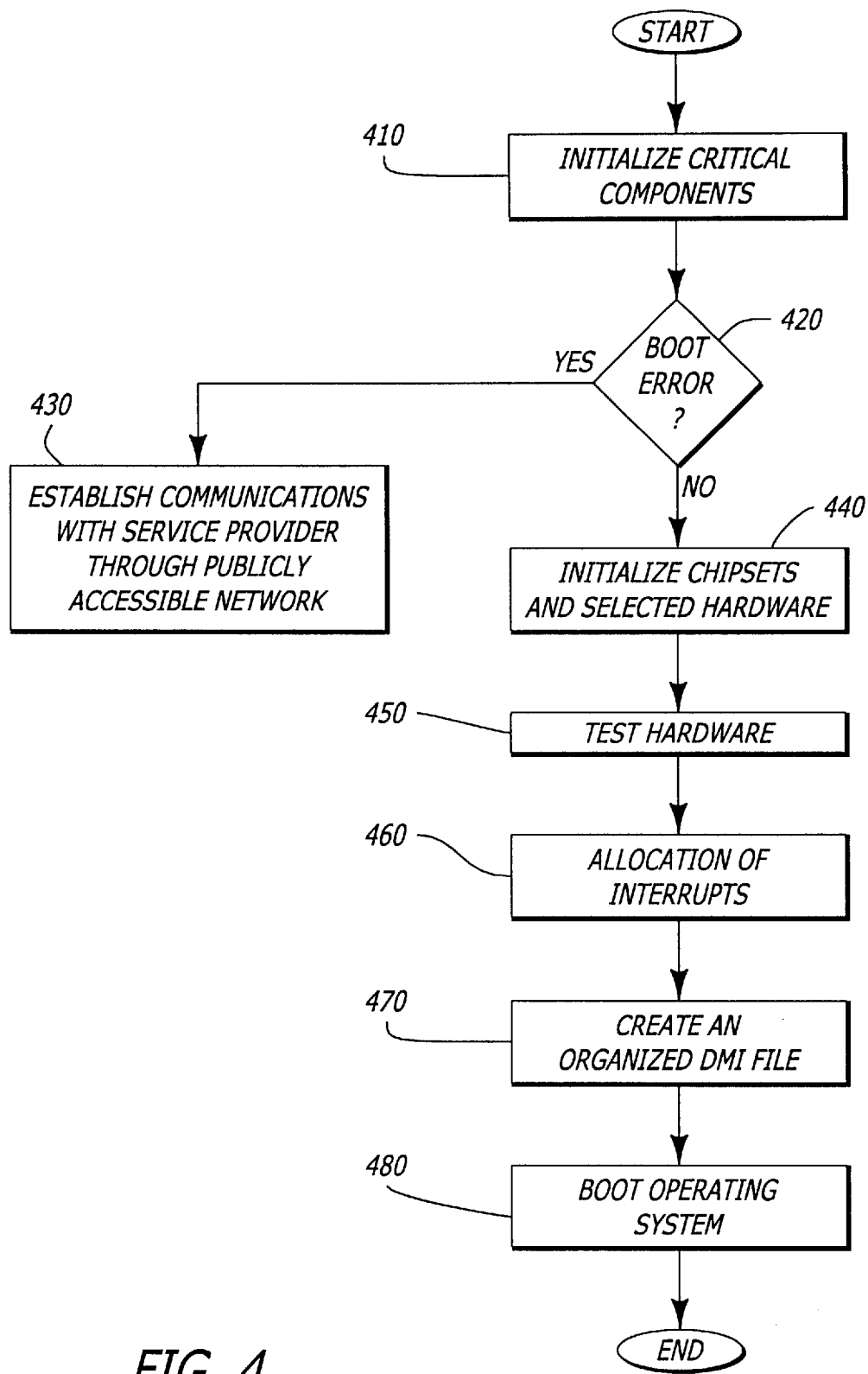
FIG. 4 is a flowchart illustrating another embodiment of the Web BIOS boot sequence that establishes an interconnection over a network for remote servicing of the electronic system upon experiencing a boot error.

Referring now to FIG. 4, another flowchart illustrating the operations of the Web BIOS boot sequence is shown. After the electronic system has been powered, it undergoes a boot sequence in which components critical to establishing remote access through a publicly accessible network are initialized before proceeding with the standard boot sequence (Step 410). The initialization of these critical components is discussed with reference to FIG. 5. If it is necessary to service a boot error in the electronic system before proceeding with the standard boot sequence, remote communications are established over the Internet as discussed above (Steps 420–430). Otherwise, the boot sequence proceeds as discussed above by performing an initialization, testing and allocation phases before loading the operating system (Steps 440–480).

Figure 5:
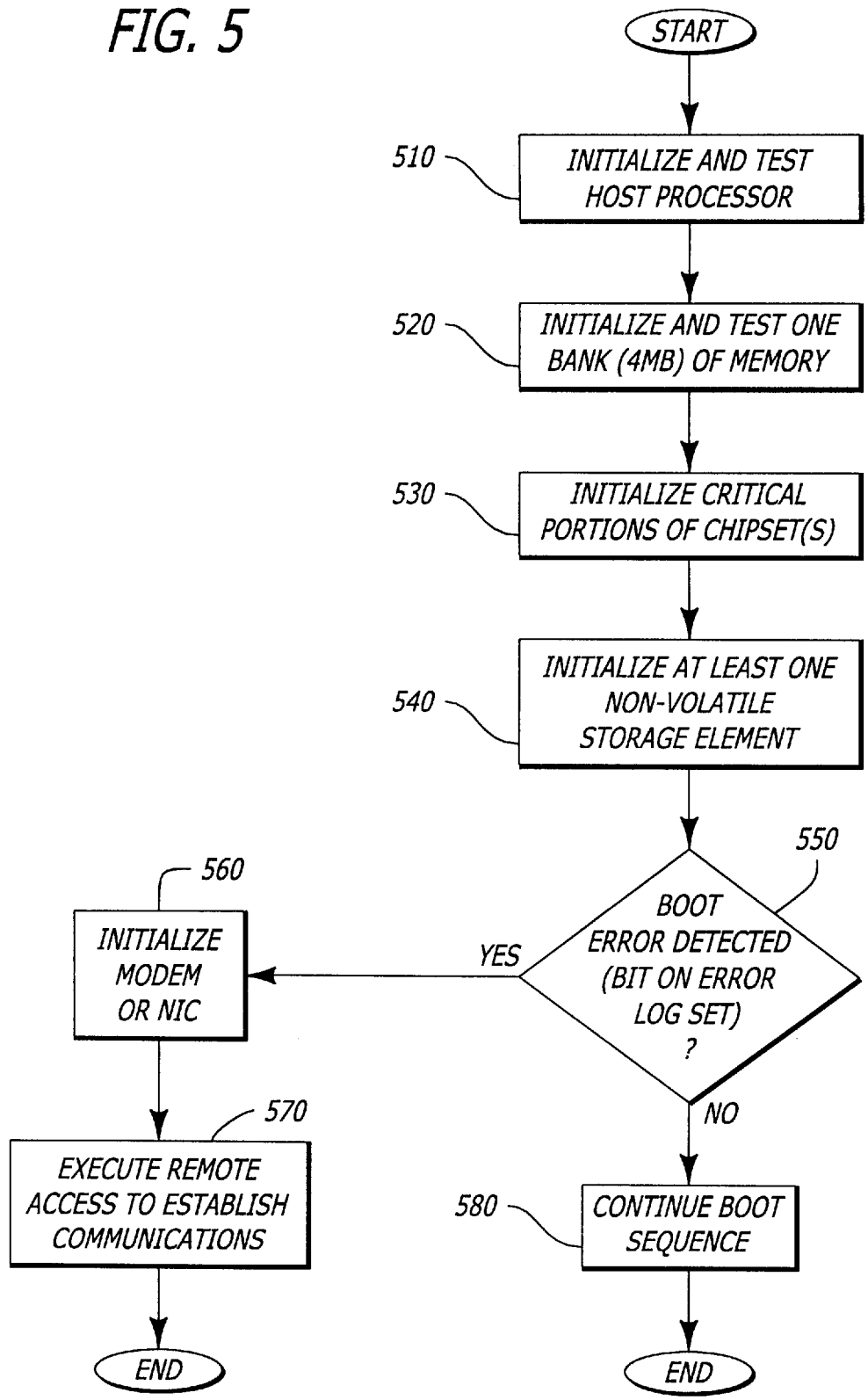
FIG. 5 is a more-detailed flowchart of the initialization step performed before establishing the interconnection over the network as shown in FIG. 4.

Referring now to FIG. 5, a more-detailed embodiment of the initialization and testing of components necessary in supporting the Web BIOS boot sequence is shown. First, the host processor is tested to determine that it is functioning properly (Step 510). Next, at least one bank of direct random access memory ("DRAM") of main memory is tested to detect whether the memory bank is functional or non-functional (Step 520). Thereafter, critical portions of the chipset(s), such as a Super I/O controller for example, as well as some non-volatile memory are initialized to find the Internet address and possibly add a time stamp to the request for service (Steps 530–540). Upon completion of these initialization and testing phases, in Step 550, the host processor determines whether a boot error has been detected such as by monitoring whether a flag (e.g., a single bit of memory), associated with each of the necessary components, has been set within the BIOS. If so, indicating that a boot error has occurred, the electronic system establishes remote access to a service provider through a publicly accessible network by initializing the modem or NIC and signaling the modem or NIC to establish appropriate connections (Steps 560–570). Otherwise, in Step 580, the boot sequence proceeds through its normal boot sequence.

Figure 6:
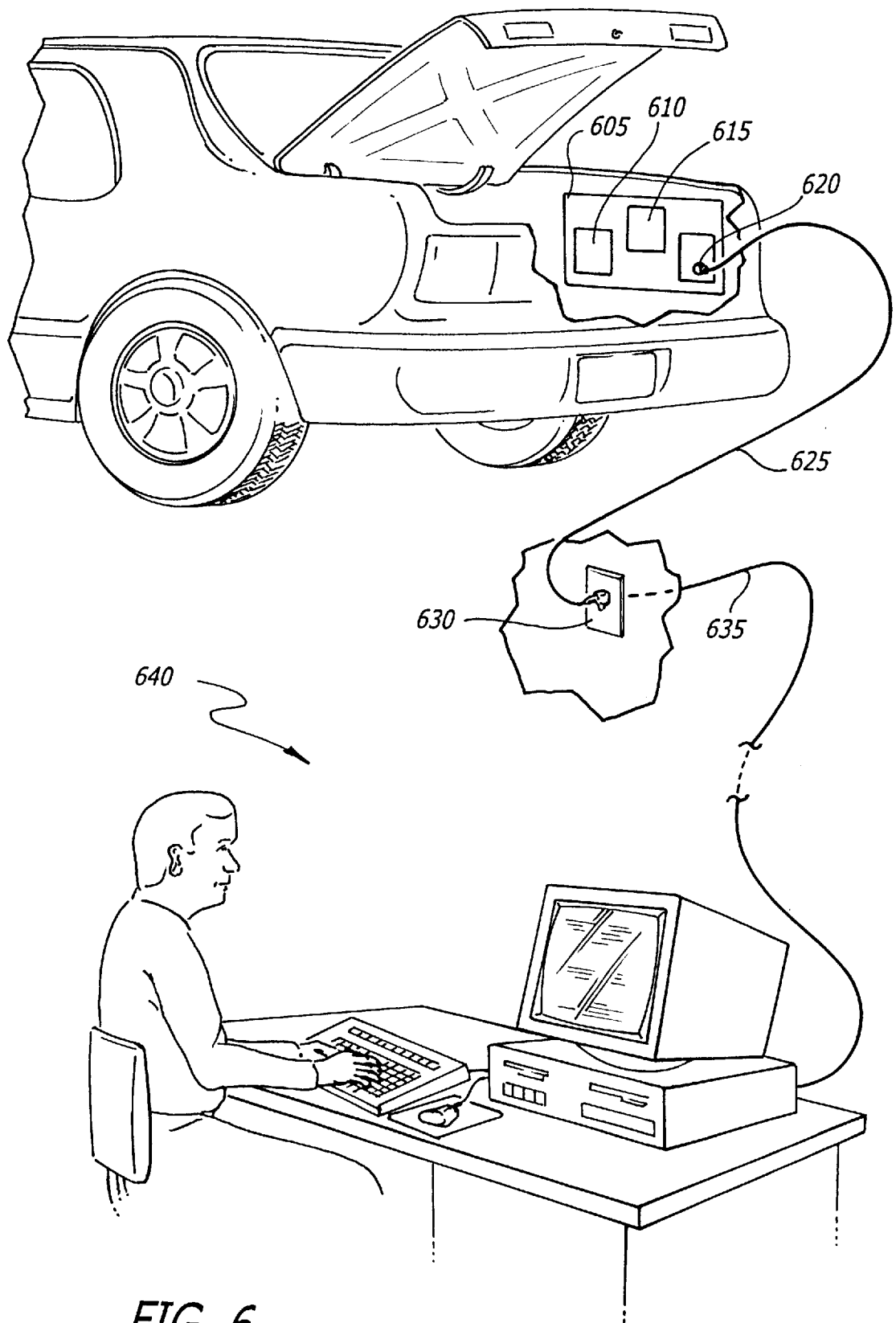
FIG. 6 is a perspective view of another embodiment of the electronic system utilizing the present invention through establishing the interconnection over the network for diagnostic purposes.

Referring now to FIG. 6, a perspective view of another embodiment of the electronic system utilizing the present invention through establishing the interconnection over the publicly accessible network is shown. The electronic system includes a vehicle 600 incorporating a printed circuit board ("PCB") 605 including at least a host processor 610, non-volatile memory 615 and a connector 620 such as a Universal Serial Bus ("USB") connector. The PCB 605 is powered-on upon turning the ignition key to start the vehicle or place the vehicle in a powered state prior to starting the vehicle. Upon power-on, the host processor 610 executes the Web BIOS boot sequence within the non-volatile memory 615 to perform internal diagnostics on the vehicle 600. A cable 625 may be coupled to both the connector 620 and a phone jack 630 to download data through the phone lines 635 to a remote technician 640 for diagnostic purposes. Thereafter, the technician 640 may modify the contents of the non-volatile memory by electrically accessing certain parameters to correct a problem with the vehicle 600.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for enabling remote diagnostics of a first electronic system, the method comprising:
   (1) initializing selected circuitry within the first electronic system prior to anticipated loading of an operating system, said selected circuitry includes hardware to establish remote communications with a second electronic system;
   (2) determining whether at least one boot error has occurred for the selected circuitry; and
   (3) automatically establishing communications with the second electronic system, without user input, through a publicly accessible network for diagnostics of the first electronic system, provided the at least one boot error has occurred.

2. The method according to claim 1, wherein the initializing of the selected circuitry includes:
   initializing a plurality of chipsets of the first electronic system;
   initializing a transceiver device of the first electronic system; and
   initializing non-volatile memory of the first electronic system.

3. The method according to claim 1, wherein prior to determining whether the at least one boot error has occurred, the method further comprises:
   generating a table; and
   recording boot errors detected during initialization of the selected circuitry in the table.

4. The method according to claim 3, wherein the determining whether the at least one boot error has occurred includes:
   accessing an entry of the table in order to obtain results of the boot sequence for the selected circuitry; and
   detecting whether a boot error bit of the entry is set to indicate that the selected boot error occurred.

5. An electronic system comprising:
   a bus;
   a host processor coupled to the bus;
   a transceiver device coupled to the bus; and
   a non-volatile memory element coupled to the bus, said non-volatile memory element including Basic Input/Output System (BIOS) code which, when executed by the host processor, (i) causes initialization and testing of the selected circuitry, including the host processor, used to establish communications with a remotely located electronic system, and (iii) signals, without user input, the transceiver device to establish communications with the remotely located system for diagnostics of the electronic system when a boot error associated with the selected circuitry is detected.

6. The electronic system according to claim 5, wherein the transceiver device includes a network interface card.

7. The electronic system according to claim 5, wherein the BIOS code contained within the non-volatile memory includes a web browser application.

8. The electronic system according to claim 7, wherein the BIOS code further includes at least a web address of the service provider.

9. The electronic system according to claim 8, wherein the BIOS code further includes at least one Internet access phone number.

10. The method according to claim 1, wherein after initializing the selected circuitry, the method further comprises testing the selected circuitry; and providing an interrupt scheme for the first electronic system.

11. The method according to claim 1, wherein the establishing of communications with the second electronic system includes signaling the transceiver device to establish appropriate connections with a service provider over the publicly accessible network.

12. The electronic system according to claim 5, wherein the transceiver device includes a Universal Serial Bus connector.

13. The electronic system according to claim 5, wherein the remote system is used to analyze an error log produced by the electronic system.

\* \* \* \* \*